Feb. 14, 1933.   P. C. TIMM   1,897,407
PROJECTING SCRIBE
Filed Oct. 12, 1929   2 Sheets-Sheet 1
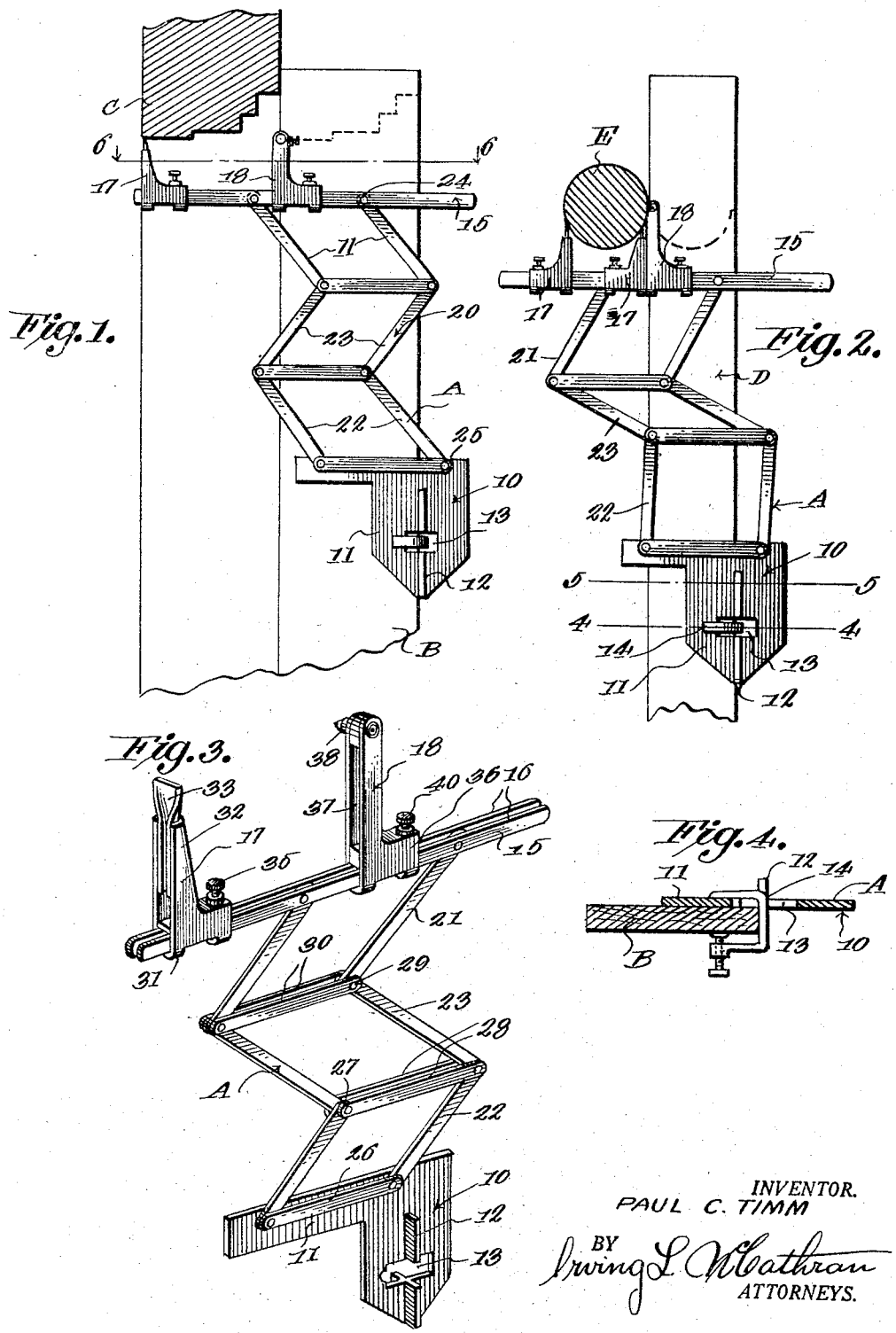
INVENTOR.
PAUL C. TIMM
BY Irving L. Cathran
ATTORNEYS.

Feb. 14, 1933.   P. C. TIMM   1,897,407
PROJECTING SCRIBE
Filed Oct. 12, 1929   2 Sheets-Sheet 2
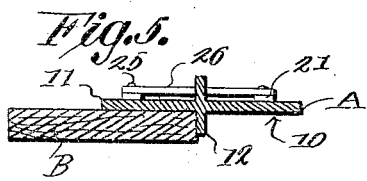
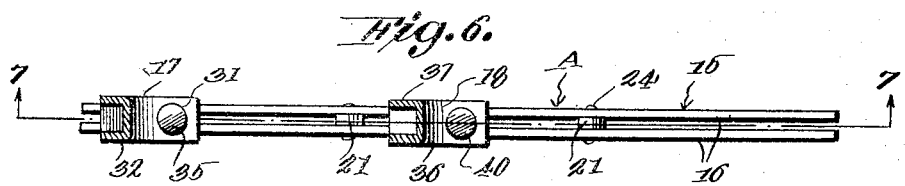
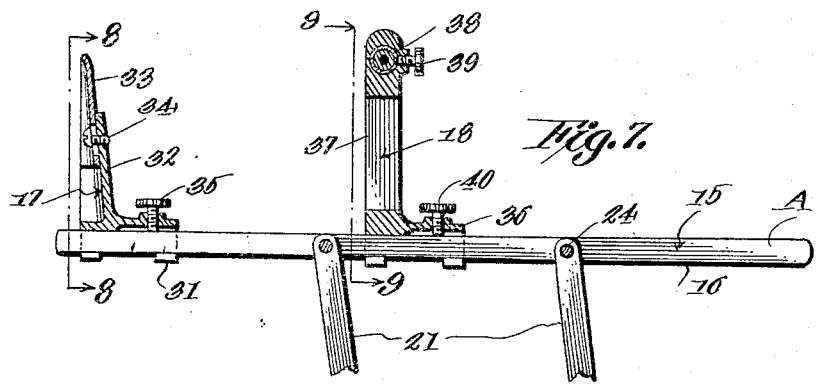
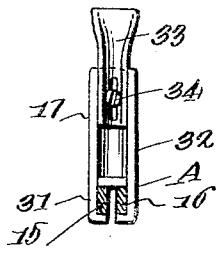   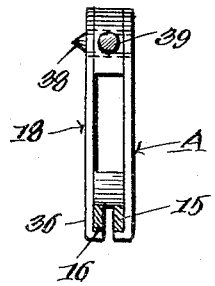
INVENTOR.
PAUL C. TIMM Patented Feb. 14, 1933

1,897,407

UNITED STATES PATENT OFFICE

PAUL C. TIMM, OF LINCOLN, NEBRASKA

PROJECTING SCRIBE

Application filed October 12, 1929. Serial No. 399,274.

This invention appertains to carpenters' tools and more particularly to a novel tool for facilitating the accurate fitting of boards and the like in window and door casings.

One of the primary objects of my invention is to provide a tool for accurately marking a piece of material which is to be placed between two fixed objects which have irregular surfaces or edges, such as a window board or stool, the device embodying a base or clamp plate for engaging the material to be scribed and cut having novel means associated therewith for engaging the irregular surface and means connected therewith for marking or scribing the material to be cut in exact accordance with the irregular surface.

Another important object of my invention is the provision of a device for scribing boards and like material to be fitted between two fixed objects having irregular surfaces embodying a base plate adapted to be clamped to the board to be scribed, with a parallel bar connected to the base plate by suitable links which maintain the bar parallel to the base plate at all times with a scriber or marker for the board adjustably carried on the bar and a feeling gage for movement over the irregular surface of the fixed object adjustably mounted on the bar, whereby upon movement of the feeler over the irregular surface of the fixed object the scriber or marker will mark the board or other material to be cut in exact accordance with said irregular surface.

A further object of my invention is the provision of novel means for forming the base plate whereby the same can be maintained in correct and proper adjusted position on the board or other material to be cut with novel means for holding the feeler point and the scriber or marker in an adjusted position on the parallel bar.

A still further object of my invention is to provide an improved carpenter's tool of the above character, which will be durable and efficient in use, one that will be simple and easy to manufacture and one which can be placed upon the market at a reasonable cost, and permit the marking of a board in exact accordance with the surface where the same is to be fitted in a minimum amount of time and with the expenditure of a minimum amount of labor.

With these and other objects in view, the invention consists in the novel construction, arrangement and formation of parts, as will be hereinafter more specifically described, claimed, and illustrated in the accompanying drawings, in which drawings:—

Figure 1 is a top plan view of my improved tool showing the same in use for scribing a board to be fitted between a door or window casing.

Figure 2 is a similar view showing the tool in use for scribing a board or other piece of material to be fitted against a round object.

Figure 3 is a perspective view of my improved tool.

Figure 4 is a transverse section through the base plate of the tool taken on the line 4—4 of Figure 2 illustrating the means for clamping the same on the work.

Figure 5 is a transverse section taken on the line 5—5 of Figure 2 looking in the direction of the arrows, showing the construction of the base plate for engaging the work.

Figure 6 is a section taken on the line 6—6 of Figure 1 looking in the direction of the arrows showing the scriber and feeler slidably mounted on the parallel board.

Figure 7 is a horizontal section taken on the line 7—7 of Figure 6 looking in the direction of the arrows showing the feeler point and scriber slidably mounted on the parallel bar.

Figure 8 is a detail section taken on the line 8—8 of Figure 7 looking in the direction of the arrows showing the construction of the feeler point.

Figure 9 is a detail section taken on the line 9—9 of Figure 7 looking in the direction of the arrows illustrating the marker or scriber.

Referring to the drawings in detail, wherein similar reference characters designate corresponding parts throughout the several views, the letter A generally indicates my improved tool and B the work such as a piece of board which is to be scribed and cut according to the irregular surface of a window frame or door casing C.

My improved tool A comprises an attaching base or 90 degree angle bar 10 which includes a flat metal plate 11 for engaging one surface of the board B or other material to be scribed and cut, and the opposite faces of the flat plate 11 are provided with right angularly extending guide ribs 12 which are adapted to be placed against one edge of the work B. This plate 11 can be provided with an opening 13 for the reception of a work clamp 14 whereby the base can be readily clamped to the work.

Arranged forwardly of the base 10 is a parallel bar 15, which is adapted to be maintained in parallel relation to the front edge of the base 10 at all times by a novel linkage 20, which will be later described. The parallel bar 15 can be made in any desired way, but in the present instance I have shown the same to include upper and lower spaced parallel strips which receive therebetween a part of the novel linkage 20, as will be hereinafter more fully pointed out. The parallel bar 15 slidably and adjustably carries the feeler or gage member 17 and the scriber or marker member 18 for the work and these members will likewise be more fully described.

The novel linkage 20 employed for connecting the base 10 and the parallel bar 15 together with the bar 15 in parallel relation with one edge of the base at all times embodies front and rear sets of parallel links 21 and 22 and an intermediate set of parallel links 23. The forward edges of the front set of parallel links 21 are pivotally connected to the strips 16 of the parallel bar 15 by the use of suitable pivot pins or the like 24 and as shown these links 21 are placed between the strips 16.

The outer ends of the rear set of links 22 are pivotally connected by means of suitable pivot pins or the like 25 with the plate 11 of the base 10 adjacent to its front straight edge and a suitable strip 26 is employed for overlying these ends of the links 22. The adjacent ends of the links 22 and 23 are pivotally connected by means of pins 27 and the pivot points 27 are maintained in spaced parallel relation by strips 28 which lie on opposite sides of the sets of links 23 and 22 and these strips 28 are likewise pivotally carried by the pins 27. The adjacent ends of the links 21 and 23 are likewise pivotally connected together by pivot pins 29 and these pivot pins are maintained in spaced parallel relation by the strips 30 which lie on opposite sides of the links and are likewise carried by the pivot pins 29.

By this construction it can be seen that the bar 15 can be moved back and forth and still held in its parallel relation to the front edge of the plate 11 at all times.

The feeler or guider member 17 embodies a slide bracket 36 which receives the parallel bar 15 and the bracket 36 is provided with a laterally extending arm 32 of substantially U-shape in cross section. This arm 32 receives the feeler point 33 which is adjustable longitudinally of the arm feeler. This feeler point 33 is held in adjusted position by a set screw 34 which extends through a slot formed in the feeler point and into the arm 32.

The slide bracket 31 can be held in adjusted position by a set screw 35 which is adapted to impinge against the parallel bar 15.

The scriber or marker member is of somewhat a similar construction to the feeler member 17 and likewise includes a slide bracket 36 mounted on the parallel bar 15. This bracket 36 carries the laterally extending arm 37 having formed in its outer end a section of the marking pencil or the like 38. This pencil or other marking point 38 is held in adjusted position on the terminal of the arm by a set screw 39.

One or more of the feeler points 33 can be used on the parallel bar 15 according to the nature of the work to be done.

In operation of the improved device for marking a board or other piece of material to be placed between two fixed points and having irregular surfaces or edges as shown in Figure 1 of the drawings, the base 10 is clamped on the board B by means of the work clamp 14 as shown in Figure 4 of the drawings, and the pencil or other marking point 38 is placed on the work or board, the board being placed along side of the door or window casing, as shown in Figure 1, as the case may be.

The feeler point 33 is now placed in engagement with the irregular surface of the object and the marking point or pencil will reproduce the exact contour of the surface as the point 33 is moved over the irregular surface. The scribing action takes place on a plane projected or set apart from that surface. The device is interchangeable in that either side may be used. By this, I mean, that if the left side of the board is to be scribed, the workman need only to turn the whole device over.

The tool performs its work efficiently and easily and in work of this character it is ordinarily a difficult task to fit a piece of material into a place which has two fixed objects which have irregular surfaces or edges.

In Figure 2 I have illustrated the device being used for fitting a board, indicated by the reference character D, or similar work against a round post or the like, indicated by the reference character E, and the tool is used in the same manner as described in Figure 1. However, I prefer to use two of the feeler members 17, as shown in Figure 2, and the feeler points 33 of these members are placed on opposite sides of the round post or other object after which the bar is manipulated so as to move one of the points over the outer surface of the post and the point will mark the exact contour on the board or work D.

Changes in details may be made without departing from the spirit or the scope of this invention, but:—

What I claim as new is:

1. A carpenter's tool for scribing a board to be fitted against an object having an irregular surface, a plate for engaging one face of the work and adapted to extend across the work, means for clamping the plate on the board, the plate having a straight edge, a parallel bar also adapted to extend across the face of the work, a feeler point for engaging the irregular surface, carried by the bar, a marking point adjustably carried by the bar, a linkage connecting the bar to the plate for maintaining the bar in parallel relation to the straight edge of the plate at all times, the linkage including inner and outer sets of spaced parallel leads and an intermediate set of parallel leads, means pivotally connecting the outer ends of the inner and outer set of leads to the plate and bar respectively, means securing the ends of the sets of leads together, and strips pivotally connected to the sets of leads at their pivot points for maintaining the same in spaced relation.

2. A carpenter's tool for scribing a board to be fitted against an object having an irregular surface, a plate for engaging one face of the work and provided with an integral rib arranged at right angles to the plate, said rib being adapted to abut the edge of the work and the plate being adapted to extend across the face of the work, said plate provided with an aperture formed therein extending transversely of said rib, a clamp adapted to pass through said aperture and engage the work for firmly securing the plate to the work, a bar adapted to extend also across the face of the work, a feeler point adjustably carried by said bar for engaging the irregular surface, a marking point adjustably carried by said bar, a linkage connecting the bar to the plate for maintaining the bar in parallel relation with respect to one edge of said plate at all times, the linkage including inner and outer sets of spaced parallel leads and an intermediate set of parallel leads, means pivotally connecting the outer ends of the inner and outer sets of leads to the plate and bar respectively, means securing the ends of the sets of leads together, and strips pivotally connecting the ends of the leads at their pivot points for maintaining the same in spaced relation.

3. A carpenter's tool for scribing a board to be fitted against an object having an irregular surface, a plate for engaging one face of the work and provided with abutment means thereon for abutting against the edge of the work, said plate adapted to extend across the face of the work, a bar adapted to extend parallel to said plate across the face of said work, a linkage connection between said plate and bar for permitting the movement of said bar away from said plate and at all times holding said bar in parallel relation with respect to said plate extending across the face of the work, an adjustable marker carried by said bar, an adjustable feeler member carried by said bar, said adjustable feeler member having a projecting arm substantially U-shaped in cross section, said feeler member having an adjustable extremity provided with a substantially U-shaped shank fitting in the first mentioned substantially U-shaped shank, the outer end of said extremity being flared and flat to provide a comparatively wide work-following edge to facilitate the accurate copying of an irregular surface.

In testimony whereof I affix my signature.

PAUL C. TIMM.